(12) United States Patent
Stoll et al.

(10) Patent No.: US 6,460,466 B1
(45) Date of Patent: Oct. 8, 2002

(54) DRIVE DEVICE

(75) Inventors: Kurt Stoll, Esslingen; Martin Maichl, Salach; Maximilian Haslinger, Stuttgart; Thomas Reininger, Wernau, all of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/380,465

(22) PCT Filed: Jan. 13, 1998

(86) PCT No.: PCT/EP98/00153

§ 371 (c)(1),
(2), (4) Date: Sep. 1, 1999

(87) PCT Pub. No.: WO98/41462

PCT Pub. Date: Sep. 24, 1998

(30) Foreign Application Priority Data

Mar. 17, 1997 (DE) .......................................... 197 10 790

(51) Int. Cl.⁷ ................................................ B60L 13/04
(52) U.S. Cl. ......................... 104/281; 104/156; 310/12
(58) Field of Search ................................ 104/156, 155, 104/281, 282, 283, 292, 296; 290/1 R; 310/12, 13, 14

(56) References Cited

U.S. PATENT DOCUMENTS

| | | | | |
|---|---|---|---|---|
| 2,898,485 A | | 8/1959 | Richter et al. | |
| 3,847,502 A | * | 11/1974 | Isbell | ........................... 415/92 |
| 3,882,791 A | * | 5/1975 | Youngscap | ................... 104/154 |
| 3,954,064 A | * | 5/1976 | Minovitch | ............... 104/138 R |
| 4,645,182 A | * | 2/1987 | Stoll | ........................... 254/264 |
| 5,537,929 A | * | 7/1996 | Miura et al. | .............. 104/138.1 |

FOREIGN PATENT DOCUMENTS

| | | | |
|---|---|---|---|
| EP | 0 603 471 A | 6/1994 | |
| JP | 62-123954 | 6/1987 | |
| JP | 62123954 | * 6/1987 | ................. 310/152 |
| JP | 07071419 A | 3/1990 | |

* cited by examiner

Primary Examiner—S. Joseph Morano
Assistant Examiner—Frantz F. Jules
(74) Attorney, Agent, or Firm—Hoffmann & Baron, LLP

(57) ABSTRACT

The invention provides a driving device comprising a tubular housing (2) and a moving unit (4) which is positioned on the housing (2) in such a way that it can be moved lengthwise therein. Said moving unit (4) comprises an internal part which is located in the housing (2) and an external part which is located outside the housing (2), both parts being magnetically coupled. The magnetic coupling creates a coupling device which produces at least one closed magnetic circuit (13) via the outer part (6) and which fully traverses the inner part (5) and the housing (2).

30 Claims, 3 Drawing Sheets

DRIVE DEVICE

The invention relates to a drive device, comprising a tubular housing, on which a longitudinally moving movable unit is mounted, such unit having an inner part located in the interior of the housing and an outer part which is arranged externally on the housing and is magnetically coupled for movement with the inner part by means of a coupling means having at least one permanent magnet means.

Drive devices of this type, which are designed in the form of so-called rodless fluid power drive cylinders, are disclosed for example in the European patent publication 0 603 471 A1, the German patent publication (utility model) 1,982,379, the German patent publication 2,922,444 C2, the German patent publication (utility model) 8,230,298 or the German patent publication 2,207,126 B. Their inner part is designed in the form of a piston-like drive part able to be driven by fluid power in the longitudinal direction of the housing, whose motion is transmitted synchronously by the magnet coupling to the outer part, the latter being able to be connected with something to be moved. The coupling means comprises in each case inner and outer magnet means, which are made up of axially or radially permanently magnetized shaped parts and produce magnetic circuits, which pass through the wall of the housing at one or more points on the periphery.

SUMMARY OF THE INVENTION

Although known drive device are based on mature and reliable technology, the costs of manufacture are relatively high. Furthermore, attempts to reduce the overall size are hindered by there being a lower limit to the dimensions of the permanent magnets employed to provide the magnetic coupling force.

It is consequently one object of the present invention to provide a drive device of the type initially mentioned, which while having low costs of manufacture and compact dimensions produces high magnetic coupling forces.

In order to achieve this object there is the provision that the coupling means produces at least one magnetic circuit extending completely through the inner part and the housing, said magnetic circuit being closed by the outer part.

Whereas in the prior art the magnetic circuits produced by the coupling means at all times only partly extend through the housing and are limited to zones, which extend around the center of the housing, the coupling means of the invention produces at least one and if required several magnetic circuits, which completely pass through the housing and the input part athwart the longitudinal direction so that practically there is a diametral passage of a section of the magnetic circuit through the housing and the inner part. It has turned out that in the case of such an arrangement the permanent magnets employed are able to function at substantially better operating point so that there are larger coupling forces, which render possible a reduction in the volume of the magnet means and accordingly of the movable unit generally. Furthermore it is possible to utilize magnet means with a simple geometry, something which reduces the costs of production.

Further advantageous developments of the invention are defined in the dependent claims.

It is possible to so design the coupling means that at least one magnetic circuit produced by it extends only once through the inner part and the housing, the return taking place externally around part of the periphery of the housing via the outer part provided with components of the coupling means. It serves a good purpose in this connection inter alia for the outer part to be provided with a low-retentivity return connection part, same extending in the peripheral direction at least partially around the housing. It is here that more particularly a yoke-like is suitable, it being expedient for the entire outer part to be designed like a yoke with a U-like cross section so that same may be mounted in place quite conveniently from one longitudinal side of the housing and at the same time coupled with the inner part magnetically. The result is then more particularly simple handling in the course of assembly.

The coupling means may also be so designed that at least one magnetic circuit produced by it extends twice through the inner part and the housing so that therefore the return of the magnetic circuit takes place through the housing as well, but however with the opposite flux direction. In this case as well the outer part conveniently contributes to closing the magnetic circuit, it being an advantage for the inner part to have low-retentivity flux conducting bodies, arranged in the magnetic circuit, on the corresponding longitudinal sides of the housing.

Preferably the coupling device has a plurality of coupling units arranged in sequence in the longitudinal direction, such coupling units possessing mutually cooperating inner and outer magnet means. In this respect it is possible in a simple manner to set the desired magnetic coupling force by changing the number of coupling units.

It is particularly advantageous to provide each inner magnet means present with two inner magnet units, which are more particularly plate-like or rod-like and are arranged at a right angle to the longitudinal direction of the inner part adjacent to each other and are magnetized in the same direction for partaking in the formation of the magnetic circuit. These two magnet units may be inserted from the longitudinal side in mutually oppositely placed pockets in a magnet as part of the inner part, same attracting each other owing to the direction of magnetization selected. If then spacer means are provided, which are firmly connected with the inner magnet carrier, between the magnet units, there will be an automatic fixation in the position of the magnet units on the inner magnet carrier in the transverse direction thereof. It is then possible to do without complex design measures for attachment of the magnet unit. The intermediate space between the magnet units may if required be provided in addition with a low-retentivity flux conducting member so that a strong magnetic field is ensured.

A still further advantage of the drive device is that it renders possible the realization of the most various different cross sectional shapes of the tubular housing. Circularly round cross sectional forms are just as possible as configurations departing from a circular form to prevent relative twisting, as for instance oval and more particularly elliptical cross sections or elongated flat cross sections with flat longitudinal sides and arcuately rounded narrow sides.

BRIEF DESCRIPTION OF THE DRAWINGS

In the following the invention will be described with reference to the accompanying in more detail.

Figure 5:
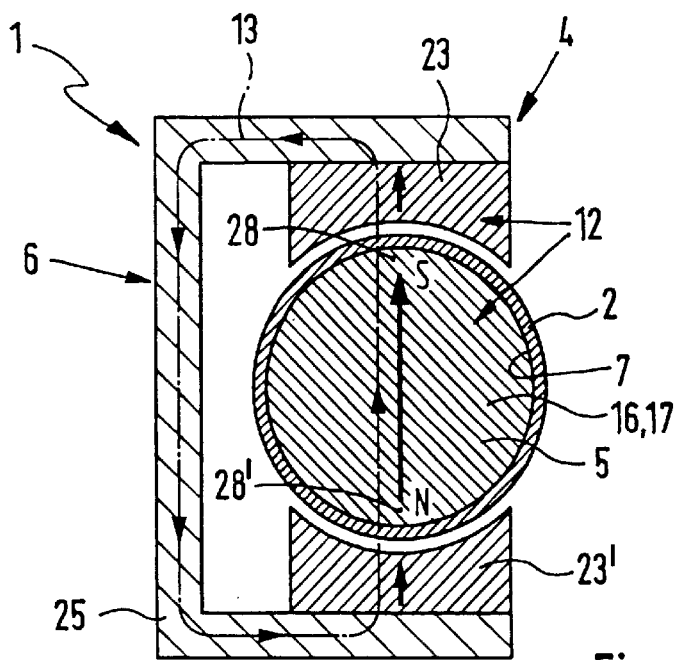

FIG. 5 shows a cross section taken through a further possible design of the drive device.

Figure 6:
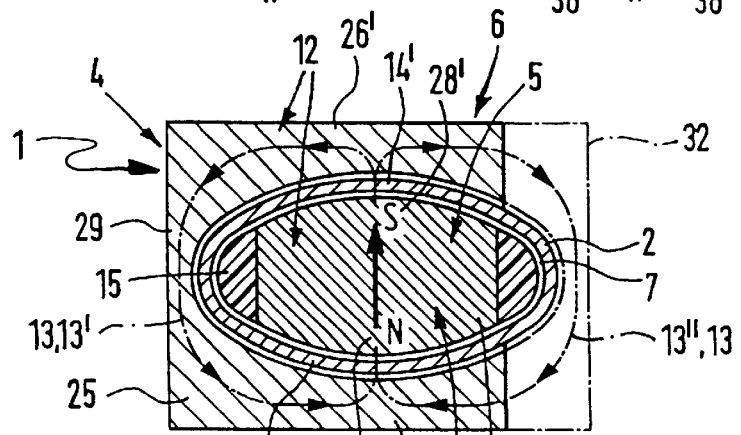

FIG. 6 is a cross section taken through a further embodiment of the drive device, a further possible alternative design being indicated in chained lines by way of amplification.

The embodiments illustrated in drawing of the drive device 1 in accordance with the invention serve for moving objects of different types and are designed in the form of rodless drive cylinders operated by fluid power and more especially pneumatically.

The drive device comprises a tubular housing 2, which in the case of the embodiments of the invention constitutes a cylindrical tube and at each end is closed off by terminating end caps, not illustrated in detail. The housing 2 preferably possesses a linear form, the longitudinal axis or, respectively, the direction of the longitudinal extent being indicated in chained lines at 3. In order to render possible movement along curved path it would be possible for the housing 2 to have curved sections of its length. On the housing 2 a movable unit 4 is arranged able to travel to and fro in the direction of the length axis 3. This unit comprises an inner part 5 operating as a drive means in the embodiment and an outer part 6 functioning as an output drive part. The inner part 5 is accommodated in the interior space 7 of the housing 3 and able to run in the longitudinal direction. In the working embodiments it is designed in the form of a piston and with a sealing effect divides up the interior space 7 axially into two working spaces 8 and 8' which in a known fashion are able to be charged with a fluid pressure medium in order to drive the inner part 5 for a driving motion along the longitudinal axis. Alternatively an electrical drive for the inner part 5 would also be conceivable, it then being unnecessary to provide any fluid-tight sealing effect between the two working spaces 8 and 8'.

The outer part 6 is located outside the housing 2 functionally near the outer periphery of the same. In the illustrated working embodiment it runs directly on the housing 2 in a longitudinally movable fashion. Its overall axial length is substantially the same as that of the inner part 5 and furthermore the longitudinal positions of the inner part 6 and in the outer part 6 are preferably identical. The inner part 5 is, dependent of the particular design, completely or partially surrounded by the outer part 16 with the housing 2 between them.

The inner part 5 and the outer part 6 have a common coupling means 12 associated with them, which is provided with a permanently magnetic magnet arrangement to be described later which magnetic force causes a contactless kinetic coupling at least in the direction of the longitudinal extent 3 between the inner part 5 and the outer part 6. It is in this manner that there is a practically rigid movable unit 4 composed of these parts. If the inner part 5 is shifted axially, the outer part 6 will move as well. This means that an object or load connected with the output drive part 5 may be conveyed. Furthermore a reverse function would be feasible, in the case of which the outer part 6 would be the drive part and the inner part 5 would be the output drive part, for example in an application as a liquid pump.

One particular feature of the drive device 1 is that the coupling means 12 is so arranged and designed that it produces a magnetic circuit 13 extending through the inner part 5 and the housing 2 completely and being closed via the outer part 6. One section of the length of this magnetic circuit 13 extends diametrally through the inner part 5 and two diametrally opposite wall sections 14 and 14' of the housing 2. It has turned out that in the case of such a design despite a small volume of the magnet arrangement high magnetic coupling forces can be produced between the inner part 5 and the outer part 6, something which renders possible the design of compact and low cost drive devices.

Figure 1:
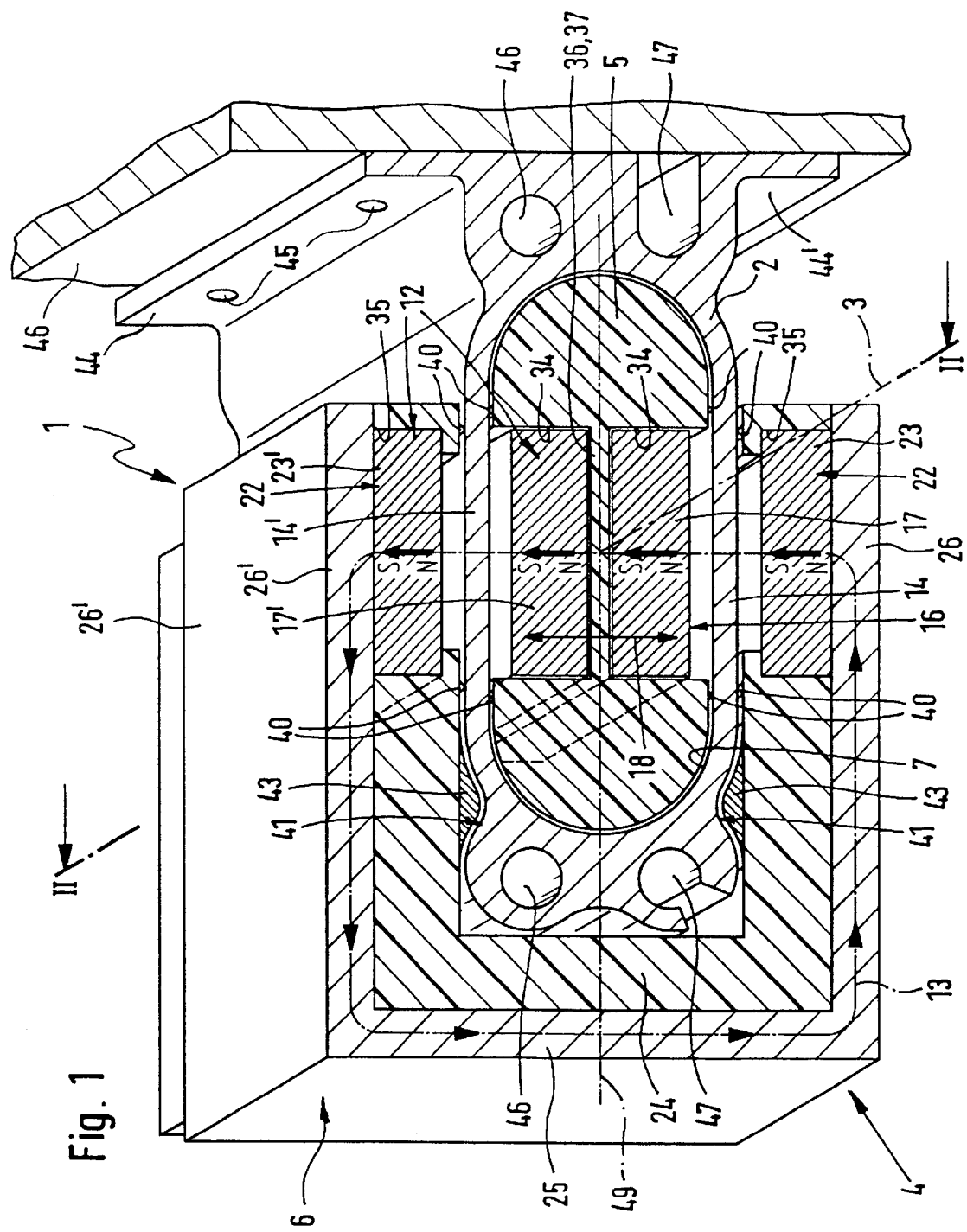
FIG. 1 shows a preferred first design of the drive device in the form of a rodless fluid power drive cylinder as seen in a cross section taken on the line I—I of FIG. 2.
Figure 2:
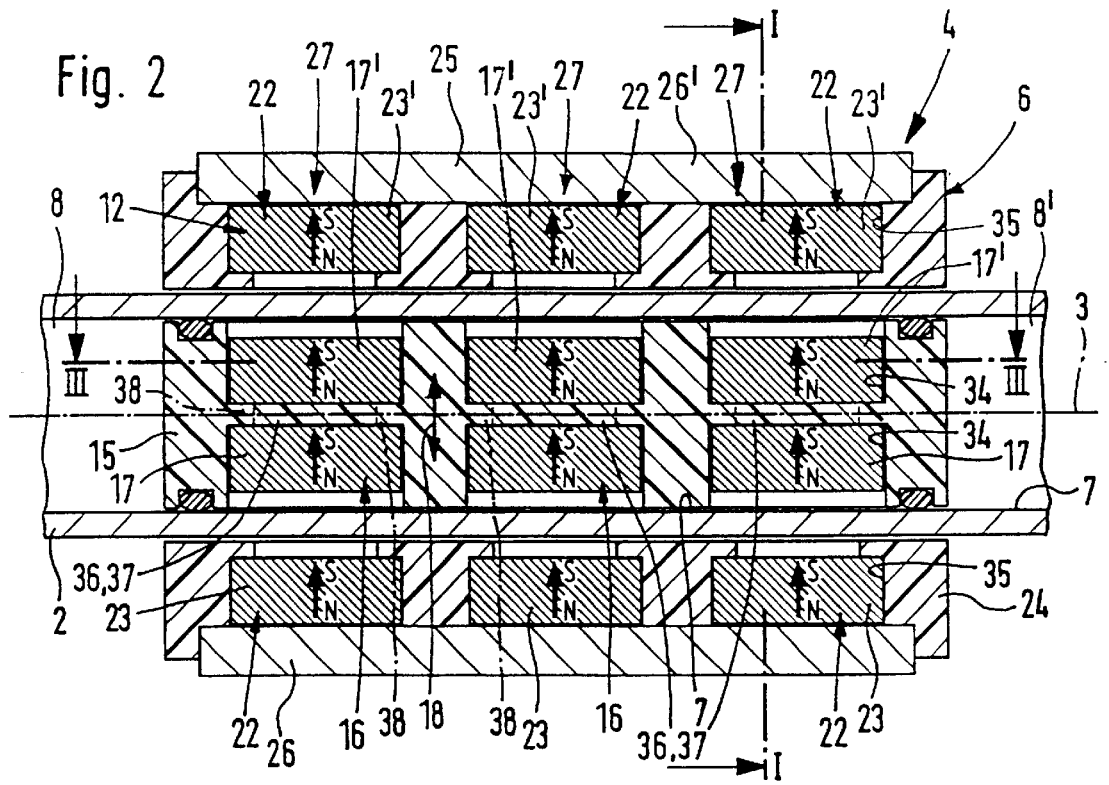
FIG. 2 is a longitudinal section taken through the drive device of FIG. 1 on the section line II—II.
Figure 3:
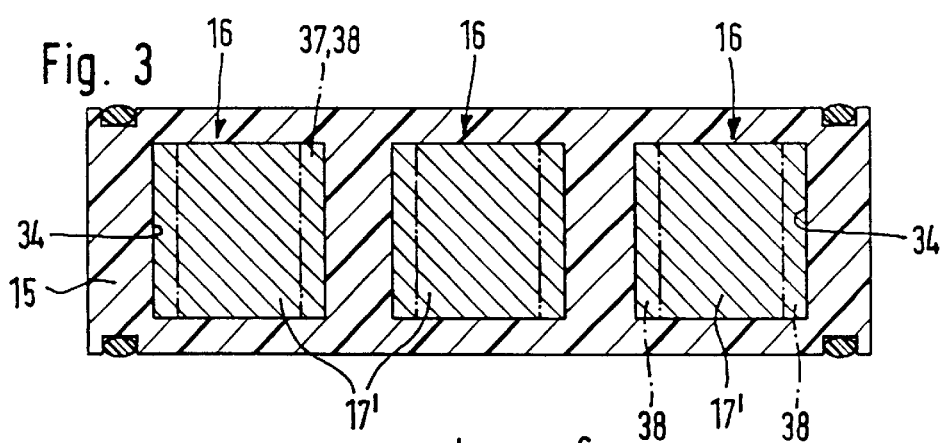
FIG. 3 is a longitudinal section through the inner part of the drive device taken on the section line III—III of FIG. 2.

With reference to FIGS. 1 through 3 a description will be provided of a preferred embodiment of the drive device 1 in more detail.

The tubular housing 2 comprises non-magnetic and non-magnetizable means, preferably of aluminum material and is best produced in the form of an extruded component. Its interior space has a cross section departing from the circular form with an elongated configuration, two of the above mentioned wall sections 14 and 14' having flat longitudinal sides and arcuately curved narrow sides. The inner part 5, which is complementary in form, is thus held from turning in relation to the housing 2.

The inner part 5 possesses an elongated inner magnet carrier 15, which is manufactured of non-magnet and non-magnetizable material, such as plastic material. It serves as a carrier for at least one, and in the working example, three permanently magnetic inner magnet means 16 following each other in the longitudinal direction with a clearance in the longitudinal direction 3 of the inner part 5. Each of these inner magnet means 16 comprises two permanently magnetic inner magnet units 17 and 17' arranged adjacent to each other and at a right angle to the longitudinal extent 3 of the inner part 5. Such magnet units are rod-like or, as shown in FIG. 3, plate-like in configuration, the planes of their plates being parallel to strip-like wall sections 14 and 14' of the housing 2, such wall sections 14 and 14' in the working example also for instance being parallel to each other in their extent. The direction of their magnetization is at a right angle to the plane of the plates and accordingly athwart and more especially at a right angle to the longitudinal axis 3, such transverse direction being indicated by double arrow 18. The inner magnet units 17 and 17' of each inner magnet means 16 are arranged with magnetization in the same direction, the direction of magnetization being indicated by arrows in the drawing.

On the outer part 6 it is convenient to provide a number of permanently magnetic inner magnet means 22 whose number is preferably equal to the number of inner magnet means 16. The axial distribution of the outer magnet means 22 is the same as that of the inner magnet means 16 so that pairs of inner and outer magnet means 16 and 22 are produced in the same longitudinal position.

Each outer magnet means 22 preferably has two permanently magnetic outer magnet units 23 and 23', which are secured on diametrally opposite longitudinal sides of the housing 2 adjacent to the above mentioned wall sections 14 and 14' on the outer part 6. The inner magnet units 17 and 17' of each inner magnet means 16 are therefore flanked at sides, which are opposite to each other in the transverse direction 18, by the two outer magnet units 23 and 23 of the associated outer magnet means 22. The direction of magnetization of the outer magnet units 23 and 23' is identical to that of the associated inner magnet units, 17 and 17'.

The outer magnet units 23 and 23' are secured to an outer magnet carrier belonging to the outer part 6. The carrier 24 preferably comprises non-magnetic and non-magnetizable material, and preferably as illustrated of plastic material. Furthermore the outer magnet units 23 and 23' are preferably designed like blocks or plates.

In addition to the outer magnet carrier 24 the outer part 6 possesses a return connection part 25 of low-retentivity material, which fits around the housing 2 over part of its periphery in the peripheral direction and an outer magnetically conducting connection between the two outer magnet units 23 and 23'. The return connection part is designed like a yoke and has a U-like cross section, it being mounted from one narrow side of the housing 2 on same so that its two yoke limbs 26 and 26' fit around at the two wall sections 14 and 14' on diametrally opposite longitudinal sides. The outer magnet units 23 and 23' make contact at the free ends with the yoke limbs 26 and 26' and more particularly from the inner side of the yoke limbs 26 and 26' so that they are flanked by the yoke limbs 26 and 26' at the outer side, which is opposite to the inner magnet units 17 and 17'.

Each outer magnet means 22 could in principle have its own separate return connection part 25. However the design illustrated is preferred, in which the outer magnet means 22 have a common return connection part 25, whose overall length is so selected that it extends over all outer magnet units 23 and 23'.

Each pair of associated inner and outer magnet means 16 and 22 together with the associated length section of the return connection part 25 constitutes a coupling unit 27, the working example having three such coupling units 27. It will be clear that the number of coupling units could readily be adapted to a particular application and the necessary coupling force. For light conveying applications even a single coupling unit 27 would be sufficient, the outer part 6 then being correspondingly short.

Each coupling unit 27 will now produce a magnetic circuit 13 of the type initially mentioned. Such circuit extends in accordance with the predetermined direction of magnetization through the inner and outer magnet units 17 and 17'; 23 and 23', it passing through the inner part 5 and the housing 2 in the transverse direction 18, and being closed or completed via the U-like return connection part 25 outside the housing 2.

The course of the magnet circuit 13 applies for all coupling units 27. The direction of magnetization of the magnet units 17 and 17'; 23 and 23'of all coupling units 27 is the same in the embodiment so that a return of a magnetic circuit via the adjacent arrangement of magnet unit does not take place. The individual magnetic circuits 13 extend through the inner part 5 and the housing 2 only once in each case.

The latter also applies for the embodiment in accordance with FIG. 6. It differs from the embodiment of the invention in accordance with FIGS. 1 through 3 however to the extent that the single or, in the case of a plurality of coupling units 27, all of same, only have one inner magnet means 16 without however having any outer magnet means. Outside the housing 2 on the outer part 6 there is only one return connection part 25 so that it is possible to do without an outer magnet carrier. The return connection part 25 is designed like a yoke as in FIG. 1 and has its yoke limbs 26 and 26' projecting over the pole ends 28 and 28' (which are aligned in the transverse direction 18) of the inner magnet means 16. In this respect it is possible, as illustrated, for the inner magnet means 16 to comprise only a single magnet unit 17, which preferably at least substantially fills up the cross section between the wall sections 14 and 14', which are flanked by the yoke limbs 26 and 26', of the housing 2. In an alternative design it would also be possible for the inner part 5 to be designed without any inner magnet means 16 and instead of this to provide only one flux conducting means of low-retentivity material, the length section, extending in the outer part 6, of the magnet circuit 13, then having at least one outer magnet means placed in it, same also being placed if required for example in the rib 29 connecting the two yoke limbs 26 and 26'. The above observations as regards possible omission or different arrangements of the inner and/or outer magnet means apply moreover for the other embodiments of the invention.

FIG. 6 indicates in chained lines a further modification of the invention, in the case of the return connection part 25 belonging to the outer part 6 is designed in the form of an annular or sleeve-like body 32 completely surrounding the housing 2 like a ring or cuff. This means that one and the same coupling unit 27 produces two magnetic circuits 13 and 13' extending completely through the inner part 5 and the housing 2 in the transverse direction 18, such circuits being returned outside the housing 2 via the return part 25, which is like a complete ring, at the mutually opposite peripheral sections of the housing 2.

FIG. 6 furthermore shows a further possible modification of the cross section of the housing 2 which here is made oval or more especially elliptical both internally and also externally.

Figure 4:
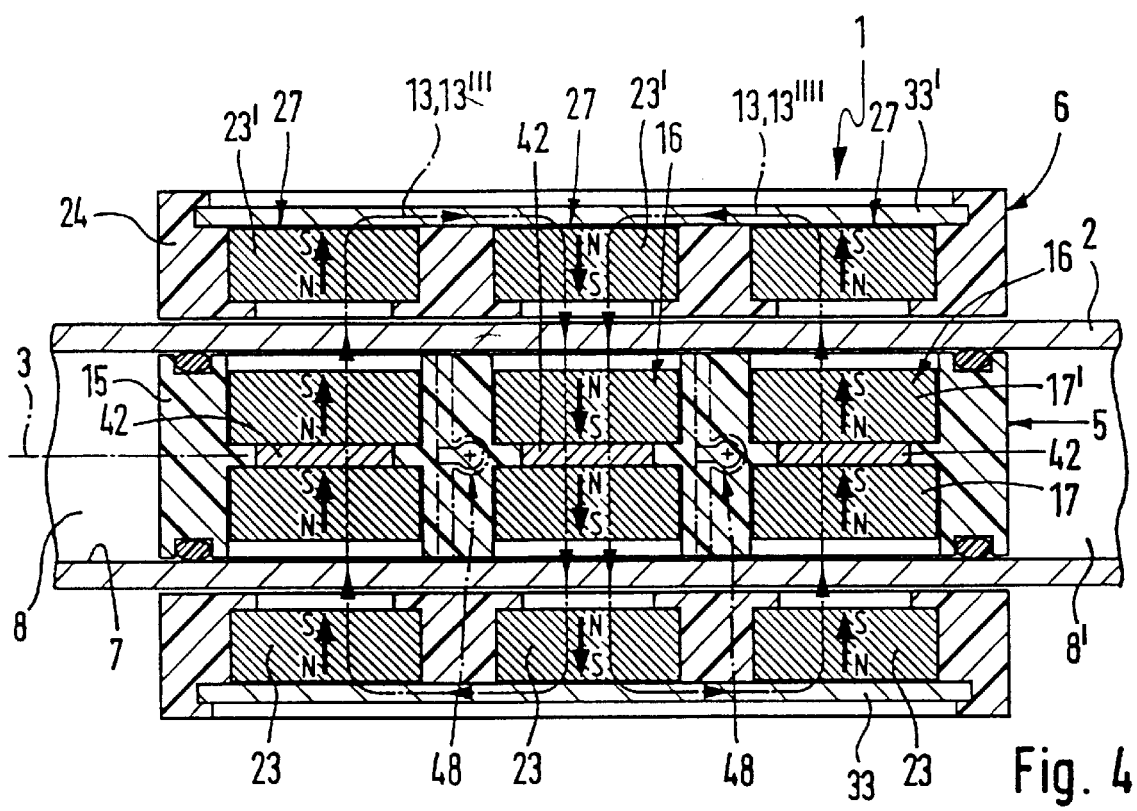
FIG. 4 shows a further embodiment of the drive device in a longitudinal cross sectional view corresponding to FIG. 2 in which there is a direction of magnetization of the individual coupling departing from that of FIGS. 1 through 3.

FIG. 4 shows an embodiment of the drive device 1, which is similar in structure to that of FIGS. 1 through 3. It as well has a plurality of coupling units 27 arranged in sequence in the axial direction, same comprising respectively an inner magnet means 16 consisting of one or more inner magnet units 17 and 17' and an outer magnet means 22, associated with it, having more particularly outer magnetic means units 23 and 23' arranged diametrally on either side of the inner magnet means 16. Unlike the design in accordance with FIGS. 1 through 3, the direction of magnetization of the magnet units 17 and 17'; 23 and 23' of respectively following coupling units 27 is opposite. Instead of a return connection part fitting around the housing 2, adjacent to the two rows of outer magnet units 23 and 23', the outer part 6 has respectively a flux guide body 33 and 33', which in the embodiment consists of a low-retentivity magnetic material of plate-like form, such flux guide body connecting the respective rows of outer magnet units 23 and 23' with one another by contacting same and more particularly covering same. The flux guide bodies 33 and 33' are in the working example held in a recess in the outer part 6. As a consequence of this arrangement the inner part 5 and the housing 2 have magnetic circuits 13''' and 13'''' passing through them twice over, the outwardly directed flux path being via the magnet units of the one respective coupling unit 27 and the return flux path being via the adjoining other coupling unit 27. The magnetic completion or connection outside the housing 2 is via the flux conducting bodies 33 and 33'. Instead of the two separate flux guide bodies 33 and 33' it would also be possible to have a return connection part 25 of the type illustrated in FIGS. 1 and 2 so that the magnetic circuit described with reference to FIGS. 1 through 3 and also with reference to FIG. 4 could occur simultaneously.

The drive device illustrated in FIG. 5 has a coupling unit 27, which possesses a single inner magnet unit 17, two outer magnet units 23 and 23' arranged on diametrally opposite outer sides of the housing 2 and, connecting the latter together, a yoke-like return connection part 25. The cross section of the housing 2 is here preferably circularly round both internally and externally. Once again the inner magnet means 16, which here is in the form of a magnetic disk, is diametrally magnetized, the outer magnet unit 23 and 23' being magnetized in the same direction. The embodiment will serve to make clear that the pole ends 28 and 28' of the inner magnet means 16, just like that of the outer means units 23 and 23', can be shaped to correspond to the form of the housing 2.

Reverting now to the working example of FIGS. 1 through 3 the reader will see a particularly advantageous possibility for the attachment of the separate magnet units 17 and 17'; 23 and 23'. In this case each magnet unit is accommodated in a recess, termed a pocket 34 and 35 in the following, in the associated magnet carrier 15 and 24.

The inner part 5 has two such pockets 34 for each coupling unit 27, which pockets are provided in the inner part 5 in opposite longitudinal sides opposite the wall sections 14 and 14'. Their outline best corresponds the outline of the magnet units 17 and 17' to be received therein, as indicated in FIG. 3. The depth, as measured in the transverse direction 18, of the pockets 34 is a little less than the correspondingly measured overall width of the inner magnet carrier so that more especially in the interior of the magnet carrier 15 a rib 35 is left, which simultaneously forms the floor of the two pockets 34. Because the magnet units 17 and 17' arranged in the pockets 34 are magnetized in the same direction, they have facing poles which are magnetically opposite. This means that they are automatically held on the rib 36. The same accordingly constitutes the spacing means 37, which in combination with the magnetic force of attraction ensures a reliable securing action holding the magnet unit 17 and 17' in place so that no additional, or if any, only very simple additional securing means is required to keep them in position.

The rib 36 could also readily have an opening through it so that as spacing means in FIGS. 2 and 3 for example projections 38 would remain which are preferably rail-like as indicated for example in FIGS. 2 and 3 in chained lines, on which the inner magnet units 17 and 17' are seated. The remaining intermediate space may if necessary, as is indicated in FIG. 4, be filled with a low-retentivity flux guide member 42, which reduces the magnetic resistance and serves to contribute to an increase in the magnetic forces. The pockets could be open toward the associated wall section 14 and 14' of the housing 2, but nevertheless the correspondence in dimensions should be such that the magnet units 15 assume positions with a radial clearance from the surface of the inner space 7.

The outer magnet units 23 and 23' are received in similar pockets 35, which are cut into the outer magnet carrier 24 from the side, opposite to the housing 2, adjacent to the wall sections 14 and 14'.

Since the outer part 6 is generally yoke-like in such a manner that apart from possibly present stabilizing or reinforcing means 43, in the mounted condition, there is no undercut in conjunction with the housing 2, lateral assembly on the housing 2 is readily possible. This also means that overloading of the magnets in the course of assembly is avoided.

In the working example the outer magnet carrier 24, like the return connection part 25, is made in the form of a yoke and comprises plastic material so that its limbs are resiliently elastic to a small extent in the transverse direction 18. Therefore during assembly the outer magnet carrier 24 may simply be clipped on the housing 2 so that stabilizing or reinforcing means 43 constituted for example by lightweight projections and provided on the inner side of its limbs, may snap into a continuous longitudinal recess 41 on the outer face of the housing 2. After this the yoke-like return connection part 25 is slipped on in place, which owing to its metallic design is comparatively rigid and has its limbs 26 and 26' fitting over the limbs of the outer magnet carrier 24 and supports same to resist splaying out in the transverse direction. Accordingly the limbs of the outer magnet means 22 are held against bending open and as well the position of the outer part 6 is fixed of the housing 2.

In order to reduce friction during the longitudinal movement of the movable unit 4 it is possible to provide runners on the outer part 6 and/or the inner part 5, such runners being in sliding contact with the housing 2. They can be formed integrally on the associated inner or, respectively, outer magnet carrier 15.

The slipped-on return connection part 25 is held by magnetic force. In the case of need it is however possible to provide an additional fixing means.

Owing to the yoke-like design of the outer part 6 only a part of the housing 2 is surrounded. This means that there is the possibility of providing at least one longitudinally extending rail 44 and 44' in the area not occupied by the outer part 6, for stiffening and/or attachment of the housing 2, such rails being more particularly integrally formed or molded. The at least one rail 44 and 44' may have through holes 45 in which attachment means may be fitted in order to hold the housing 2 on any desired supporting structure 46, as for example on the wall of a building. In the wall of the housing 2 it is possible to form one or more through channels extending in the longitudinal direction, which, when they are closed, may be employed for fluid. It is in this manner that it is possible for example for pressure medium supplied at one end to be passed to the other opposite working space. As shown in FIG. 1 it is possible for groove-like recesses to be formed in the housing 2 in the longitudinal direction as well. On the end of the channels 46 and/or recesses 47 covers can be screwed using self-tapping threads. It is also possible, if required, to anchor sensors or other additional means therein.

In the working example there is a respective channel at the two narrow sides of the housing 2 and furthermore a recess 47, which are formed in the projections from the housing and which project from the housing 2 like ears.

In order to make it possible for the movable unit 4 to be shifted along a path which at least in sections is curved, it is possible for the inner part 5 and the outer part 6 to be divided up into a plurality of segments following one another in the longitudinal direction. These segments are then, as indicated in FIG. 4 in chained lines, connected together by joint means 48 for limited pivotal movement. The joint means 48 of the inner part and of the outer part are in the case of best located at the same level as the middle plane 49, extending in the longitudinal direction of the cross section, of the housing 2.

What is claimed is:

1. A drive device, comprising a tubular housing (2) including a longitudinally moving movable unit (4) mounted thereon, the movable unit having an inner part (5) located in an interior of the housing (2) and an outer part (6) which is arranged externally on the housing (2) and is magnetically coupled for movement with the inner part by means of a coupling means (12) having at least one permanent magnetic means (16 and 22), the coupling means (12) producing at least one magnetic circuit (13) completely passing through the inner part (5) and the housing (2), said magnetic circuit (13) being closed via the outer part (6), and in the at least one closed magnetic circuit (13) an inner permanently magnetic magnet means (16) is provided on the inner part (6), and said at least one magnetic circuit (13, 13' and 13.') passes only twice through the inner part (5) and the housing (2) and is guided outside the housing (2) via the outer part (6) around the housing (2).

2. The drive device as claimed in claim 1, characterized in that at least one magnetic circuit (13, 13' and 13") passes only twice through the inner part (5) and the housing (2) and is guided outside the housing (2) via the outer part (6) around the housing (2).

3. The drive device as claimed in claim 1, characterized in that at least one magnetic circuit (13, 13' and 13") passes at least twice through the inner part (5) and the housing (2) with an opposite flux direction and at opposite longitudinal sides of the housing (2) is closed via the outer part (6).

4. The drive device as claimed in claim 1, wherein said inner permanent magnet means (16) are positioned adjacent each other in the longitudinal direction of the inner part (5).

5. The drive device as claims in claim 1, characterised in that each inner magnet means (16) posses at least one inner permanently magnetic unit (17 and 17').

6. The drive device as claimed in claim 5, characterized in that each inner means (16) possesses two inner magnet units (17 and 17') arranged adjacent to each other athwart the longitudinal extent (3) of the inner part (5), such units being magnetized in the same direction.

7. The drive device as claims in claim 6, characterized in that each magnet unit (17 and 17') is held in a pocket (34) in an inner magnet carrier best manufactured of non-magnetizable material and more particularly of plastic material, in the inner part (5).

8. The drive device as claimed in claim 7, characterized in that the pockets (34) are open on the longitudinal side facing the wall of the housing (2) of the inner magnet carrier (15).

9. The drive device as claimed in claim 5, characterised in that the inner an/or outer magnet units (17 and 17'; 23 and 23') are one of plate-, rod- and block-like structure.

10. The drive device as claimed in claim 1, characterized in that in the at least one closed magnet circuit (13) an outer permanently magnetic magnet means (22) is provided arranged on the outer part (6).

11. The drive device as claimed in claim 10, characterised in that on the outer part (6) a plurality of outer magnet means (22) are provided in sequence in the longitudinal direction (3) of the outer part (6).

12. The drive device as claimed in claim 10, characterized in that each outer magnet means (22) has two permanently magnetic outer magnet unit (23 and 23') arranged on diametrally opposite longitudinal sides of the housing (2) on the outer part (6).

13. The drive device as claimed in claim 12, characterized in that the outer magnet units (23 and 23') of a plurality of sequentially following outer magnet means (22) on the respective longitudinal side of the housing (2) are connected by plate-like, low-retentivity flux guide bodies (33 and 33') in a magnetically conducting manner.

14. The drive device as claims in claim 1, characterized in that the a cross section of the inner space (7) containing the inner part (5), of the housing (2) is circularly round or departs from the circular form and is oval or has flat longitudinal sides and arcuately rounded narrow sides.

15. The drive device as claimed in any one of the claims 1 through 14, characterized in that the cross section of the inner space (7) containing the inner part (5), of the housing (2) is circularly round or departs from the circular form and is oval or has flat longitudinal sides and arcuately rounded narrow sides.

16. The drive device as claimed in claim 1, characterized in that the coupling means (12) possesses at least one coupling unit (27), which comprises an inner magnet means (16) and an outer magnet means (22).

17. The drive device as claimed in claim 1, characterized in that the outer part (6) possesses at least one low-retentivity return connection part (25) fitting around the housing (2) over at least a part of its periphery, in which part at least one closed magnetic circuit runs.

18. The drive device as claimed in claim 17, characterized in that the return connection part (25) is a sleeve-like body (32) completely surrounding the housing (2).

19. The drive device as claimed in claim 1, wherein said inner part (5) and the outer part (6) are divided up into a plurality of segments following each other in the longitudinal direction (3) and are connected in an articulated manner together to render possible non-linear longitudinal means.

20. The drive device as claimed in claim 1, characterized in that the inner part (5) is a fluid operated drive part and the outer part (6) is adapted to be connected with the object to be moved.

21. A drive device, comprising:

a tubular housing including a longitudinally moving movable unit mounted thereon, the movable unit having an inner part located in an interior of the housing and an outer part which is arranged externally on the housing and is magnetically coupled for movement with the inner part by means of a coupling means having at least one permanent magnetic means, the coupling means producing at least one magnetic circuit completely passing through the inner part and the housing, said magnetic circuit being closed via the outer part, said at least one closed magnetic circuit an inner permanently magnetic magnet means is provided on the inner part, and said coupling means (12) produces a plurality of magnetic circuits (13, 13 and 13.) extending through the housing (2) and the inner part (5) completely.

22. A drive device, comprising:

a tubular housing including a longitudinally moving movable unit mounted thereon, the movable unit having an inner part located in an interior of the housing and an outer part which is arranged externally on the housing and is magnetically coupled for movement with the inner part by means of a coupling means having at least one permanent magnetic means, the coupling means producing at least one magnetic circuit completely passing through the inner part and the housing, said magnetic circuit being closed via the outer part, said at least one closed magnetic circuit an inner permanently magnetic magnet means is provided on the inner part;

said at least one permanent magnet means possess at least one inner permanently magnetic unit arranged adjacent to each other athwart the longitudinal extent of the inner part, such units being magnetized in the same direction;

at least one pocket, said pocket holding said each magnet unit, said pocket located in an inner magnet carrier manufactured from a non-magnetizable material and more particularly of plastic material in the inner part; and said two inner magnet units (17 and 17.) of a respective inner magnet means (16) are received in separate pockets (34), and between the magnet units (17 and 17.) spacer means (37) are provided which are secured to the inner magnet carrier (15).

23. The drive device as claimed in claim 22, characterized in that between the adjacently placed inner magnet units (17 and 17') a low-retentivity flux guide member (42) is arranged.

24. A drive device, comprising:

a tubular housing including a longitudinally moving movable unit mounted thereon, the movable unit having an inner part located in an interior of the housing and an outer part which is arranged externally on the housing and is magnetically coupled for movement with the inner part by means of a coupling means having at least one permanent magnetic means, the coupling means producing at least one magnetic circuit completely passing through the inner part and the housing, said magnetic circuit being closed via the outer part, said at least one closed magnetic circuit an inner permanently magnetic magnet means is provided on the inner part, said at least one closed magnetic circuit an outer permanently magnetic means is provided arranged on the outer part, wherein each outer magnet means has two permanently magnetic outer magnet units arranged on diametrically opposite longitudinal sides of the housing on the outer part, and said each outer magnet unit (23 and 23.) is held in a pocket (35) in an outer magnet carrier (24) preferably manufactured of a non-magnetizable material and more particularly of plastic material, of the outer part (6).

25. The drive device as claimed in claim 16, characterized in that each coupling unit (27) possesses two outer magnet units (23 and 23.), provided on mutually diametrically opposite longitudinal sides of the housing (2) on the outer part (6) and at least one inner magnet unit (17 and 17.) between the two outer magnet units (23 and 23.) on the inner part (5), the inner and outer magnet unit (17 and 17.; 23 and 23.) being magnetized within each coupling unit (27) athwart the longitudinal extent (3) of the housing (2) in the same direction.

26. The drive device as claimed in claim 25, characterized in that the direction of magnetization of the magnet units (17 and 17'; 23 and 23') of sequentially following coupling units (27) is the same.

27. The drive device as claimed in claim 25, characterized in that the direction of magnetization of the magnet units (17 and 17'; 23 and 23') of a plurality of coupling units (27) are arranged in sequence is opposite.

28. A drive device, comprising:

a tubular housing including a longitudinally moving movable unit mounted thereon, the movable unit having an inner part located in an interior of the housing and an outer part which is arranged externally on the housing and is magnetically coupled for movement with the inner part by means of a coupling means having at least one permanent magnetic means, the coupling means producing at least one magnetic circuit completely passing through the inner part and the housing, said magnetic circuit being closed via the outer part, said at least one closed magnetic circuit an inner permanently magnetic magnet means is provided on the inner part, said outer part possess at least one low-retentivity return connection part fitting around the housing over at least a part of its periphery, in which part at least one closed magnetic circuit runs, said return part is a sleeve like body completely surrounding the housing, and said return connection part (25) is yoke-like and has its yoke limbs (26 and 26.) fitted around the housing (2) at diametrically opposite longitudinal sides.

29. The drive device as claimed in claim 28 characterized in that the outer part (6) is yoke-like and has its limbs fitting about the housing (2) at diametrally opposite longitudinal sides.

30. The drive device as claimed in claim 29, characterized in that the outer part (6) has a yoke-like outer magnet carrier (24), which has pockets (35) containing outer magnet units (23 and 23') and on which a yoke-like return connection part (25) is slipped, whose yoke limbs (26 and 26') surround the outer magnet units (23 and 23').

\* \* \* \* \*